(12) United States Patent
Lyon

(10) Patent No.: US 6,920,865 B2
(45) Date of Patent: Jul. 26, 2005

(54) MECHATRONIC VEHICLE POWERTRAIN CONTROL SYSTEM

(75) Inventor: Kim M Lyon, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/353,703

(22) Filed: Jan. 29, 2003

(65) Prior Publication Data

US 2003/0143957 A1 Jul. 31, 2003

Related U.S. Application Data

(60) Provisional application No. 60/352,795, filed on Jan. 29, 2002.

(51) Int. Cl.[7] .............................. F02D 9/00; G06F 7/00
(52) U.S. Cl. ....................... 123/399; 123/361; 701/103
(58) Field of Search ................................ 123/399, 361; 701/103, 110

(56) References Cited

U.S. PATENT DOCUMENTS

| | | | |
|---|---|---|---|
| 3,683,875 A | 8/1972 | Chadwick | |
| 5,479,345 A | 12/1995 | Amsallen | |
| 5,613,469 A | 3/1997 | Rygiel | |
| 5,651,336 A | 7/1997 | Rygiel et al. | |
| 5,961,566 A | 10/1999 | Heslop | |
| 6,022,290 A | 2/2000 | Lyon | |
| 6,050,379 A | 4/2000 | Lyon | |
| 6,098,007 A * | 8/2000 | Fritz | 701/93 |
| 6,135,913 A | 10/2000 | Lyon | |
| 6,154,688 A * | 11/2000 | Dominke et al. | 701/1 |
| 6,155,230 A | 12/2000 | Iwano et al. | |
| 6,292,741 B1 * | 9/2001 | Bitzer et al. | 701/115 |
| 6,347,680 B1 | 2/2002 | Mianzo et al. | |
| 6,350,215 B1 | 2/2002 | Gierling | |
| 6,368,248 B1 * | 4/2002 | Bauer et al. | 477/111 |
| 6,379,281 B1 | 4/2002 | Collins et al. | |
| 6,386,351 B1 | 5/2002 | Salecker et al. | |
| 6,470,252 B2 * | 10/2002 | Tashiro et al. | 701/51 |
| 6,497,161 B2 * | 12/2002 | Poljansek et al. | 74/335 |
| 6,553,297 B2 * | 4/2003 | Tashiro et al. | 701/48 |
| 6,622,074 B1 * | 9/2003 | Coelingh et al. | 701/48 |
| 6,654,677 B2 * | 11/2003 | Weber et al. | 701/93 |
| 2002/0183911 A1 * | 12/2002 | Tashiro et al. | 701/48 |
| 2004/0048718 A1 * | 3/2004 | Tashiro | 477/175 |

* cited by examiner

Primary Examiner—Hai Huynh
(74) Attorney, Agent, or Firm—Thomas A. Jurecko

(57) ABSTRACT

An arrangement is provided for controlling a motor vehicle powertrain. The controller comprises means for measuring an operator request for acceleration, and means for controlling the component as a function of the operator request for acceleration.

13 Claims, 4 Drawing Sheets

MECHATRONIC VEHICLE POWERTRAIN CONTROL SYSTEM

RELATED APPLICATIONS

This application claims priority to United States Provisional Patent Application Ser. No. 60/352,795 filed Jan. 29, 2002 entitled "Mechatronic Vehicle Powertrain Control System" by Kim M. Lyon, the entire disclosure of which is incorporated by reference, herein.

BACKGROUND OF THE INVENTION

1. Field of the Invention

The present invention relates to vehicle powertrain control arrangements.

2. Background Art

Generally, vehicle powertrain control arrangements are known that utilize an electronic control unit to control operation of a variety of powertrain components on a vehicle. An example of such a mechatronic vehicle powertrain control system is illustrated in the block diagram of FIG. 1. More specifically, an engine 100 can include a variable valve timing (VVT) mechanism 102 and an electronic throttle control (ETC) 104, which are individually controlled via respective slave controllers 106 and 108. Likewise, a transmission 110/clutch 112, coupled to the engine, can include a transmission controller 114. Each of the controllers is responsive to a logic source denoted as element 116.

In a broad sense, the control logic used by such systems typically views the engine as a torque provider, and the various systems, such as transmission, climate control systems, alternator loads, etc., as competing torque customers. The system is constantly assessing available torque and torque demand from the various torque customers, and arbitrates accordingly. The focus or starting point of this control logic revolves around the amount of torque available from the engine, and how to efficiently manage delivery of the available torque.

While such systems may operate well, resolution of torque demand between competing systems may not always cause the powertrain to be operated in a manner desired by the vehicle driver.

SUMMARY OF THE INVENTION

Accordingly, the present invention provides a vehicle powertrain control system and method capable of macro-managing control of the powertrain using driver demand and historical operation of the vehicle as focus of the control logic. In other words, the present invention uses a "global" (i.e., whole vehicle) strategy logic (implemented in any suitable manner, such as a hierarchical control, fuzzy logic, or neural net architecture) that views the driver's actuation of a throttle pedal/control and brake pedal/control as an acceleration/deceleration performance request, demand, or input. Overall powertrain control, including processing of competing torque demands, is then implemented in a manner to best achieve the driver's input/demand.

The present invention will be more fully understood upon reading the following detailed description of the preferred embodiment(s) in conjunction with the accompanying drawings.

DETAILED DESCRIPTION OF THE PREFERRED EMBODIMENTS

Figure 1:
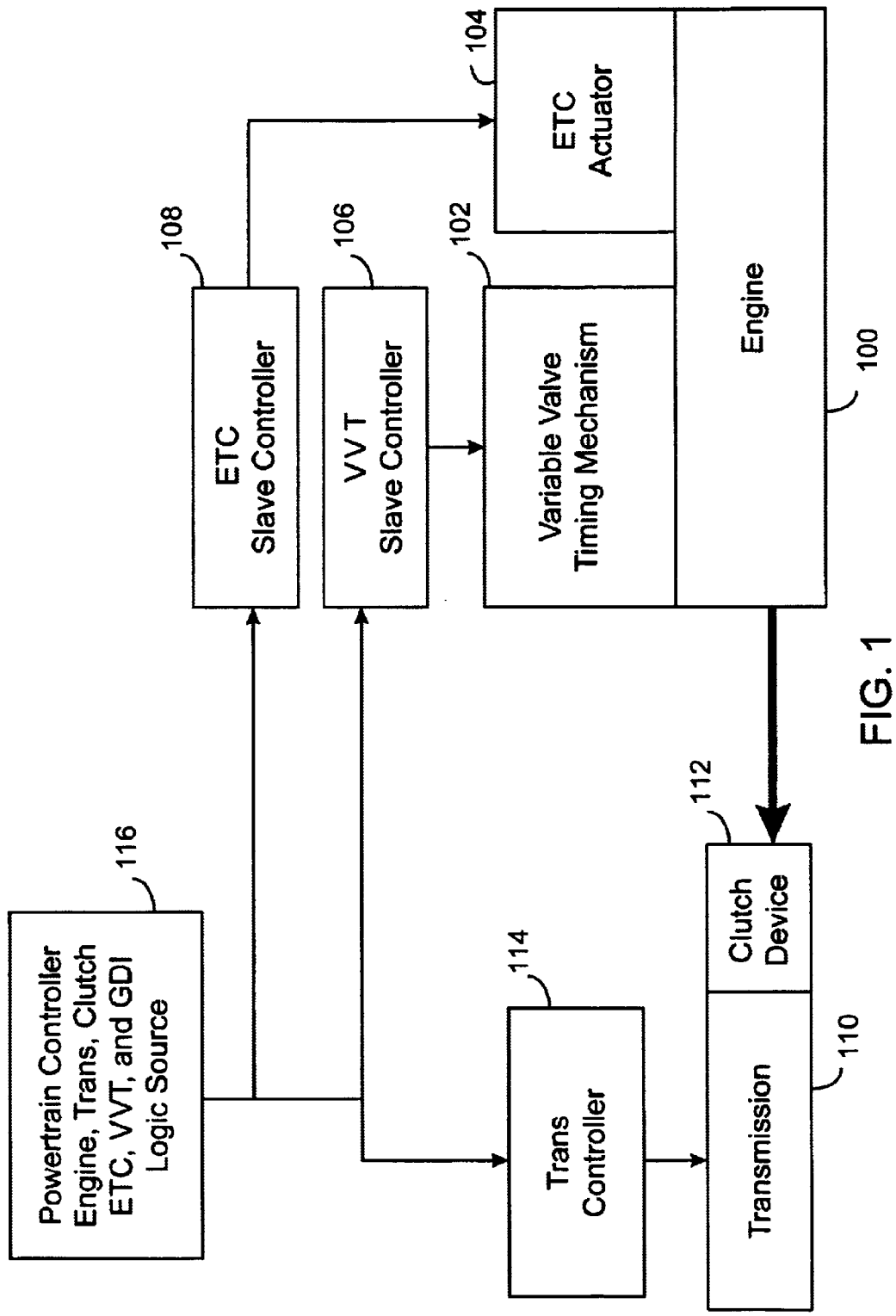
FIG. 1 is a block diagram of a conventional mechatronic vehicle powertrain control system.
Figure 2:
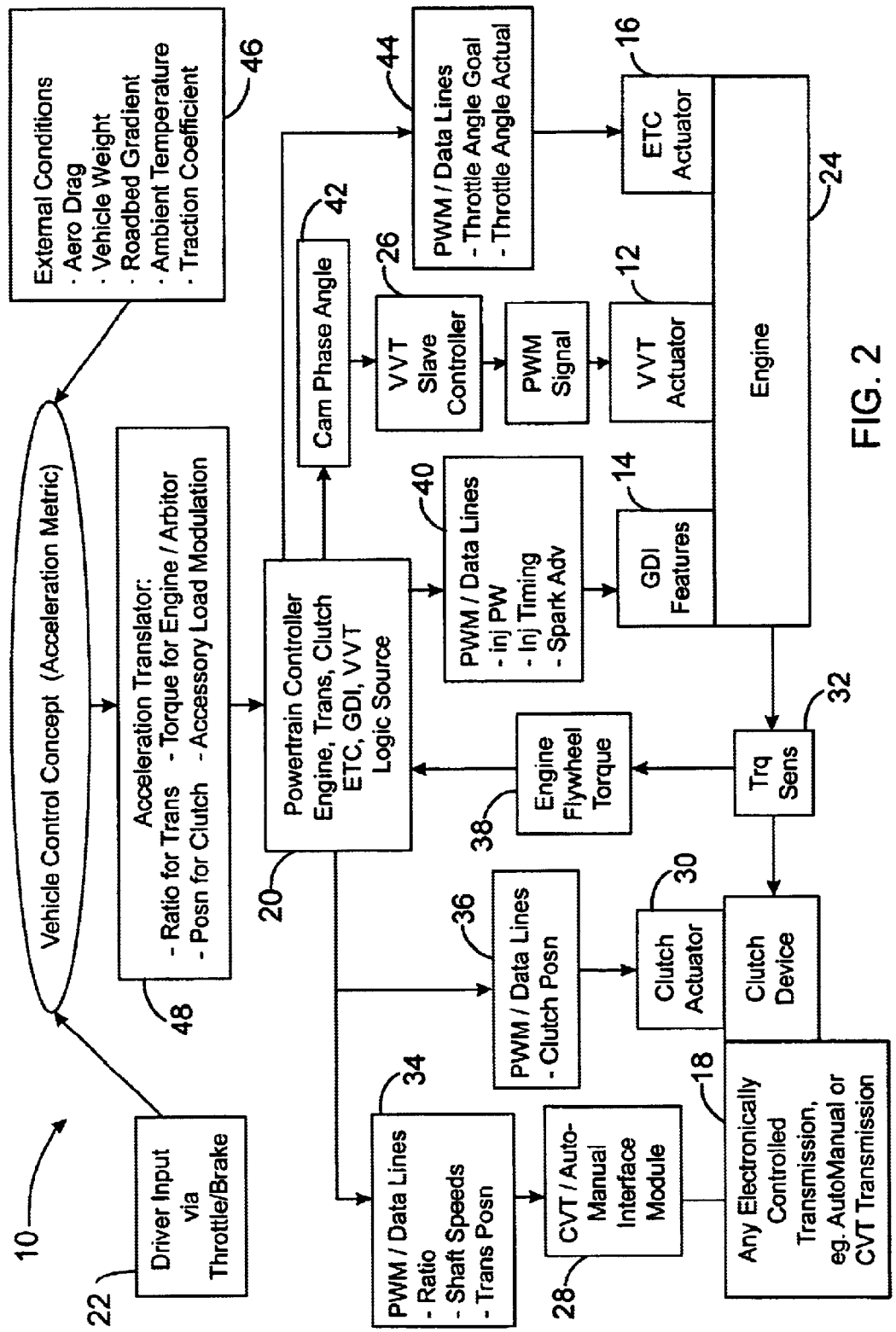
FIG. 2 is a block diagram view of a mechatronic vehicle powertrain control system according to the present invention.

As shown in the block diagram of FIG. 2, an exemplary embodiment 10 of the vehicle powertrain control system of the present invention integrates advanced engine technology, i.e., variable valve timing (VVT) 12 and gasoline direct injection (GDI) 14, electronic throttle control (ETC) 16, and advanced transmission technology such as a continuously variable transmission (CVT) or an automanual 18 with a torque measuring transducer preferably disposed therebetween, with an engine 24. Appropriate controllers, denoted as a VVT controller 26, CVT/Automanual interface module 28, clutch actuator 30, and torque sensor 32, interface with a powertrain controller 20 to implement control of the powerrain via appropriate datalines (such as using pulse width modulated (PWM) signals) denoted as boxes 34 (ratio, shaft speed, and transmission position), 36 (clutch position), 38 (engine flywheel torque), 40 (injector pulse width, injector timing, and spark advance), 42 (cam phase angle), and 44 (throttle angle goal, and throttle angle actuation). Powertrain controller 20 views driver actuation of throttle and brake pedals 22 as commands for a desired rate of vehicle acceleration (denoted as including an acceleration translator functional block 48). Such commands are affected via a change in the throttle position as inferred from the throttle controller.

Within the realm of this control, the following control "laws" apply:

1. As represented in box 46, each vehicle can be statically represented (modeled) for acceleration potential by analyzing detailed data defining:

engine output torque vs. engine speed/load for each setting of its advanced engine technology (VVT/GDI, etc.);

the vehicle weight (including any payload);

the vehicle aerodynamic drag losses derived from the vehicle cross-sectional area, speed, and ambient conditions;

the vehicle rolling resistance (road load) characteristics;

the effective transmission gearing (including final drive);

the status of any driveline slip modifier (torque converter lockup clutch, automanual clutch(s), etc.); and any additional road load loss derived from any roadbed gradient over which the vehicle is operating (inclines/declines).

2. The vehicle may be determined to be operating in one of the following "regimes" based upon a unique set of operating conditions such as MPH, RPM, manifold absolute pressure (MAP) or mass airflow, throttle angle range, throttle rate-of-change, and histogram data for any or all of the foregoing parameters:

an emission test/fuel economy mode;

a performance (sport driving) mode including traction/stability control;

a high speed cruise mode; and a towing/hilly terrain mode.

3. A hierarchy exists between the competing control processes, whereby the relative priority of an instantaneous demand for changing one or more of the integrated systems status will be hierarchically mediated by a logical state machine. Under such hierarchical state machine direction, competing demands are adjudicated serially or in parallel, according to previously defined state machine logic rules. In an exemplary embodiment, such logic rules, including limiting parameters, can take the form of:

a) the engine must operate with stable combustion. No torque-based demand shall force any integrated engine system to assume an operational mode that would cause the engine to run outside the parametric limits of stable engine combustion; and b) integrated engine system demands (GDI/VVT) will have priority over advanced transmission and electronic throttle system (ETC) demands.

As either engine system is able to fundamentally change the engine torque output vs. engine speed and load setting, the engine operation must be stabilized under the new operating condition involving GDI/VVT before additional engine system changes, such as ETC settings or CVT ratio changes, can be accommodated. This will insure that the engine is under relatively constant input and output conditions while substantial volumetric efficiency changes brought by GDI/VVT are underway. The delay in implementing ETC or transmission demands is estimated to be on the order of 100–250 msec. Given that both the vehicle operating regime and the vehicle acceleration potential may be uniquely determined at any moment in time by calculation of modeled parameters, the operation of any adjunct engine or transmission systems may be controlled so as to effectively integrate such systems into the whole of the powertrain operation. Such integration provides the powertrain with the capability to attain levels of fuel economy, drivability responsiveness, andpollutant emission superior to conventional powertrain control arrangements. The integrated powertrain control arrangement of the present invention can thus maximize powertrain responsiveness to conflicting fuel economy, emissions, and performance demands in near realtime, and otherwise provide a "global" powertrain control strategy that views the driver demand or mode of operation as the core control parameter.

Figure 3:
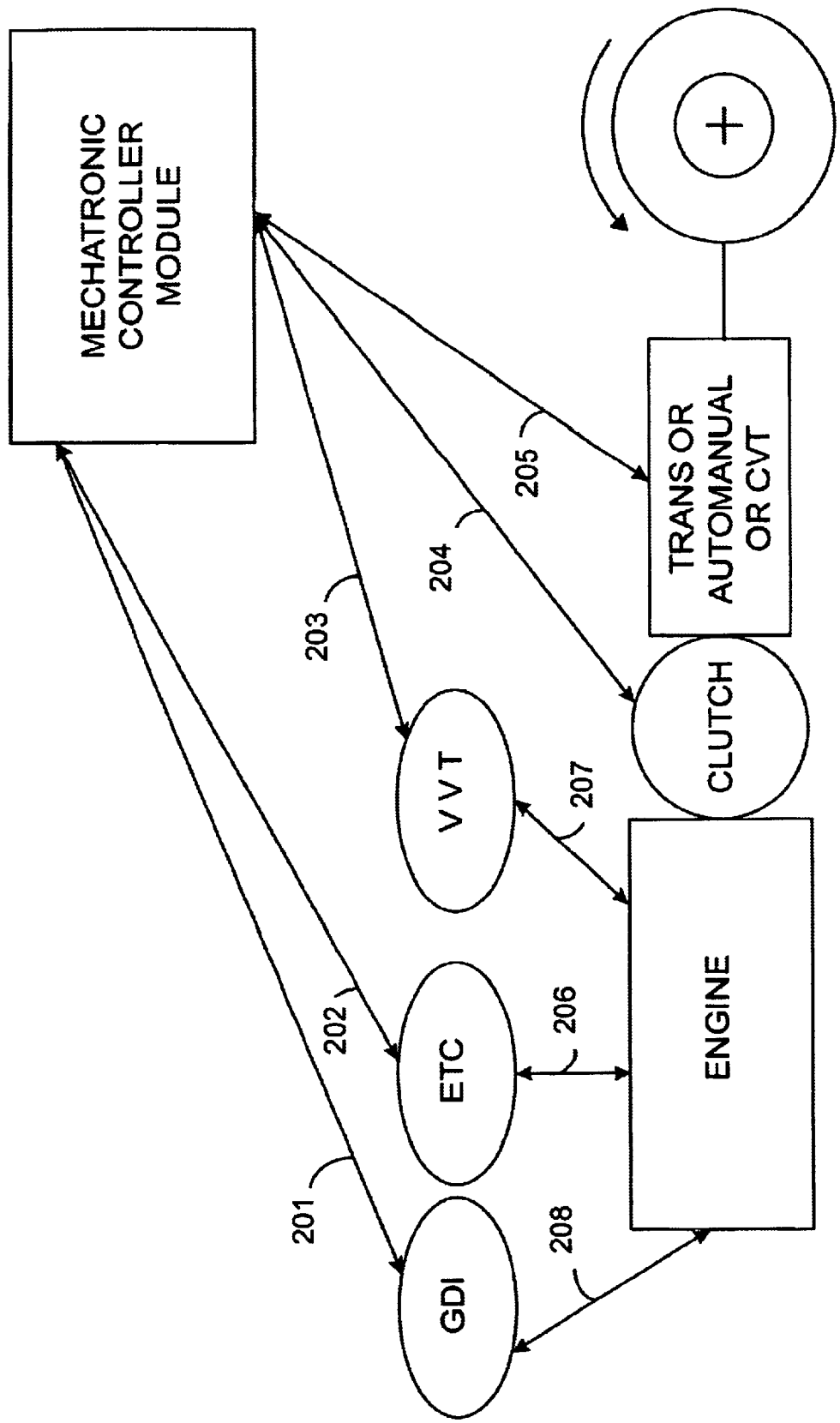
FIG. 3 is a block diagram of a control strategy according to the present invention.

The block diagram of FIG. 3 illustrates an example of such a control logic. More specifically, global vehicle powertrain control can be provided as follows:

1. Driver operates throttle pedal to "request" vehicle acceleration;
2. Every RPM/MAP or mass airflow/MPH operating point is associated with a theoretical maximum acceleration potential.

Hierarchy of Torque Based Control

1. The engine must operate with stable combustion.
2. GDI(VVT—Based Demands.
3. Trans/torque converter lockup (TCLU)—Based Demands.
4. ETC-Based Demands, i.e., Torque Arbitor, including: Economy, Emissions, Performance Modes as part of a mechatronic controller module (MCM).
Each link is identified with a reference number.
For Link 201:
  Control Laws:
  Engine must run with stable combustion;
  If in economy mode (MCM), minimize brake specific fuel consumption (BSFC);
  If in emission mode (MCM), minimize brake specific hydrocarbons (BSHC)+brake specific nitrates of oxygen (BSNOx); and If in performance mode (MCM), maximize power.
  Limiters:
  covariance (COV) of indicated mean effective pressure (IMEP), or a similar stability metric, less than or equal to a calibratable threshold;
  Engine BSFC MAP;
  Engine BSHC/NOx MAPS; and
  Engine Torque Curve.
For Link 202:
  Control Laws:
  Throttle must have safety features;
  If supporting GDI, follow torque (TRQ) based control;
  If supporting VVT, follow TRQ based control; and
  If supporting CVT, follow TRQ based control;
  Limiters:
  Failure mode and effects analysis (FMEA) & Diagnostics; and
  Engine TRQ curve.
For Link 2033:
  Control Laws:
  Engine must run with stable combustion;
  If in economy/emission mode, minimize/maximize VVT-derived valve overlap as required;
  If in performance mode, modify TRQ curve of engine vs. RPM; and
  If in cold start or idle mode, minimize VVT-derived valve overlap.
  Limiters:
  COV of IMEP or similar stability metric less than or equal to a calibratable limit;
  Engine BSFC/BSHC BSNOx MAPS; and
  Engine Torque curve.
For Link 204:
  Control Laws:
  Low speed lockup must not cause objectionable noise, vibration and harshness (NVH) issues; and
  Lower speed lockup improves fuel economy.
  Limiters:
  Powertrain NVH characteristics; and
  Powertrain fuel economy (FE) vs. NVH tradeoffs.
For Link 205:
  Control Laws:
  Transmission must provide suitable gear ratio to provide desired level of acceleration potential as commanded by driver input. A current as well as recorded throttle usage histogram can be used.
  Limiters:
  1. Ratio spread;
  2. Vehicle weight;
  3. Vehicle aero drag;
  4. Engine power;
  5. Vehicle road load friction; and
  6. Operating mode commanded by MCM.
For Link 206:
  Control Laws:
  Open Throttle only as fast as manifold can fill; and
  Open Throttle if RPM is too low or manifold pressure is too low.
  Limiters:
  Manifold Filling Time; and
  Combustion Stability Index.
For Link 207:
  Control Laws:

Engine must run with stable combustion.
Limiters:
Combustion Stability Index.
For Link 208:
Control Laws:
Engine must run with stable combustion.
Limiters:
Combustion Stability Index.

For many drivers, there is an expectation that varying the throttle position will produce an expected level of acceleration and further, that by modulating the throttle, the rate of acceleration can be controlled on either side of the zero acceleration (constant velocity) line. Thus, the driver instinctively learns the rate at which it is appropriate to press the pedal down or release it upward in order to control the vehicle's rate of acceleration or deceleration. With these considerations, a software control flow may include:

1) the vehicle's acceleration potential is calculated continually in the background knowing (or adaptively learning) weight, aerodynamic drag force, road-load friction force, velocity, roadbed gradient, engine RPM, and engine maximum torque potential at that (or any other) RPM based on all factors that govern wide open throttle (WOT) output torque such as spark advance, VVT setting, coolant temperature, charge air temperature, torque reserve, cylinder deactivation or multiple displacement system (MDS) mode, fuel air (F/A) ratio, barometric pressure, intake flow control valve setting, manifold tuning valve setting, etc. The output of this routine is the "Acceleration__Maximum__Potential" value.

2) the throttle pedal angle is read and compared to a running, filtered average. A delta throttle is calculated between the actual instantaneous setting and the filtered, running average.

3) if the instantaneous delta throttle falls within a calibrated deadband, no action is taken by the global controller.

4) if the instantaneous change (positive or negative) in throttle angle (delta throttle) is greater than the absolute value of the deadband, the value becomes an input to a two dimensional calibrated surface with delta throttle on the "x" axis and "percent accel request" on the "y" axis. The output of this step is the requested "Accel__Percent__Request."

5) the "Percent__Accel__Request" value is multiplied with the calculated maximum acceleration potential ("Accel__Max__Pot") value to create the "Accel__Rate__Goal."

Figure 4:
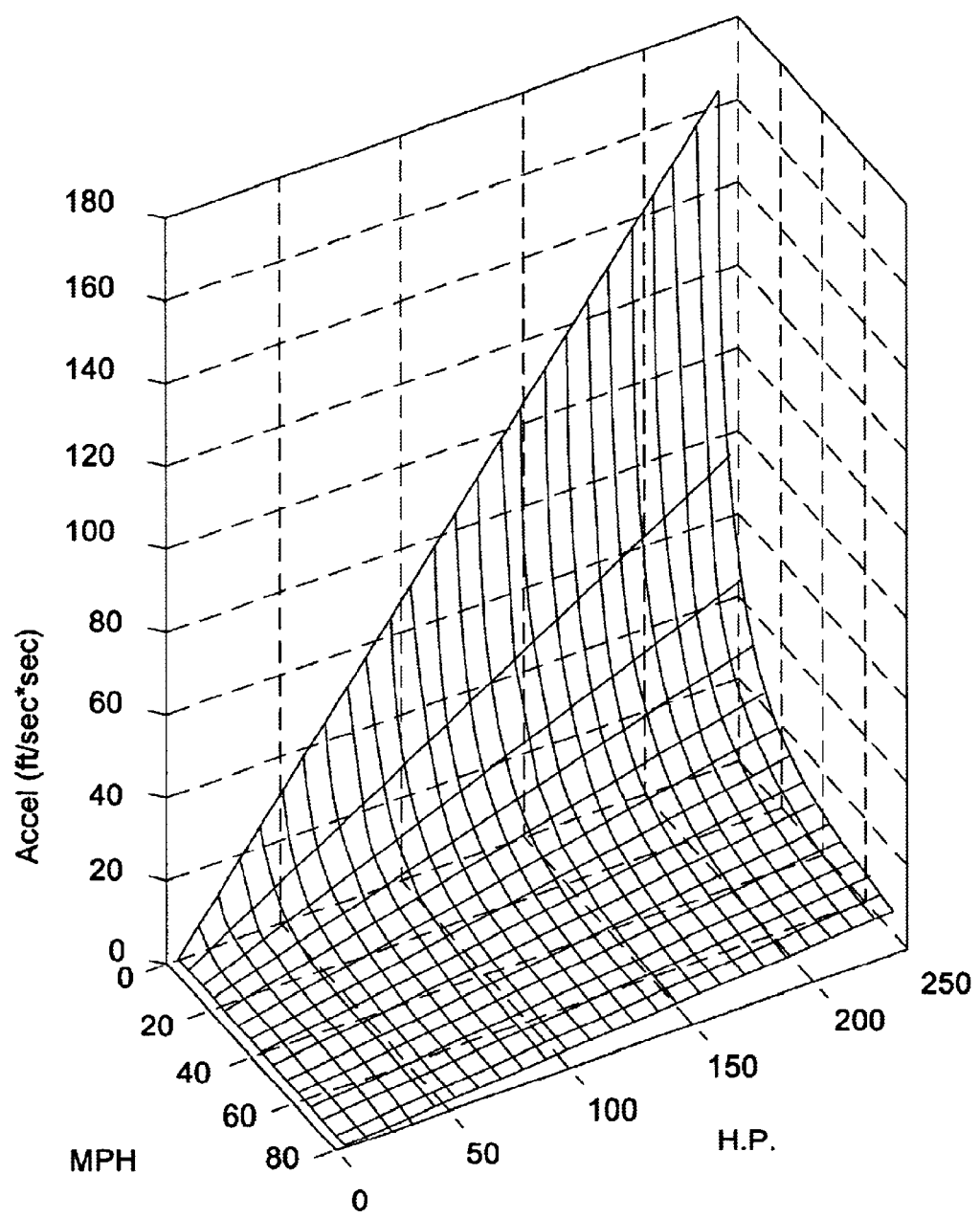
FIG. 4 is a plot of acceleration potential versus speed and horsepower of the vehicle.

6) the "Accel__Rate__Goal" then becomes an input to a three dimensional calibration surface where the inputs are MPH, Accel__Rate__Goal, and the output is the required horsepower setting to achieve the "Accel__Rate__Goal". This horsepower setting may be referred to as "Accel__Power__Goal." A representative three dimensional theoretical acceleration potential calibration surface is plotted in FIG. 4.

7) the "Accel__Power__Goal" is used to calculate the "Accel__Torque__Goal" based on the current RPM operating point. This does not imply the current RPM must be maintained, but is simply a factor in this calculation.

8) the "Accel__Torque__Goal" is the input to an optimizer routine that is used to determine other powertrain settings before issuing a torque request to the existing torque controller. The optimizer routine uses hierarchical, weighted control laws to decide the optimization target (FE, Emissions, or Performance). The optimizer output then specifies (unique for each optimization target) VVT settings, MDS state, flow control valve (FCV) setting, electromechanical converter clutch (EMCC) status, gear ratio, and engine torque request based upon the above conditions.

9) the optimizer routine additionally calculates the actual vehicle acceleration by using accelerometer sensor data (or data derived from the derivative of vehicle speed ) and compares it with the "Accel__Rate__Goal." The difference between the actual vehicle acceleration and the acceleration goal (the error vector) becomes the input to a PID control algorithm which calculates an additional term which is incorporated into the Accel__Torque__Goal." This additional term may take the form of a constant offset or multiplicative gain and reflects the closed-loop control portion of the optimizer routine.

The existing torque coordinator then decides throttle angle, spark advance, torque reserve, etc.

While one or more embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling a motor vehicle powertrain system, the method comprising:
   receiving an input indicative of an operator request for acceleration; and
   controlling a plurality of powertrain components as a function of the input so as to maximize powertrain responsiveness using a control strategy that mediates competing torque demands among the plurality of components so that the operator request is prioritized as a core control parameter, wherein mediating the competing torque demands comprises determining other powertrain component torque demands and using an optimizer routine having hierarchical weighted control laws to determine an optimized target before issuing a torque command to a torque provider.

2. The method of claim 1, wherein receiving an input comprises receiving an input responsive to throttle position.

3. The method of claim 3, wherein receiving an input comprises measuring a change in throttle position with an electronic throttle controller.

4. The method of claim 3, wherein the electronic throttle controller measures a rate of change of the throttle position.

5. The method of claim 1, wherein controlling the components comprises:
   determining vehicle acceleration potential based on known vehicle parameters, wherein determining vehicle acceleration potential comprises:
   detecting an applicable vehicle operating regime from a set of operating regimes based on predetermined vehicle operating conditions; and
   hierarchically mediating competing torque demands based on the determined vehicle operating regime and the vehicle acceleration potential.

6. The method of claim 5, wherein the vehicle operating regime and the vehicle acceleration potential are uniquely determined at any instant in time by calculation of modeled parameters and the operation of any adjunct powertrain systems are controlled so as to integrate such systems into global powertrain operation in a prioritized manner.

7. The method of claim 5, wherein mediating further comprises using a logical state machine, wherein competing demands are hierarchically adjudicated serially or in parallel according to previously defined state machine logic rules.

8. The method of claim 1, wherein controlling the components comprises referring to a three dimensional calibration surface.

9. The method of claim 8, wherein a dimension of the calibration surface is selected from the group of speed, acceleration rate goal, and required horsepower.

10. A powertrain controller for controlling a vehicle powertrain system, the controller comprising:
- a control module arranged to receive an input indicative of an operator request for acceleration; and
- a processor arranged to control a plurality of components in the vehicle powertrain system as a function of the request so as to maximize powertrain responsiveness using a control strategy that mediates competing torque demands among the plurality of components so that the operator request is prioritized as a core control parameter, wherein the processor is arranged to mediate between the competing torque demands by determining other powertrain component torque demands and using an optimizer routine having hierarchical weighted control laws to determine an optimized target before issuing a torque command to a torque provider.

11. The powertrain controller of claim 10, wherein the controller is coupled to a torque measuring transducer in operative communication with an engine of the motor vehicle.

12. The powertrain controller of claim 10, wherein the processor further comprises a look-up table of data representative of a three dimensional calibration surface.

13. The powertrain controUer of claim 12, wherein a dimension of the calibration surface is selected from the group of speed, acceleration rate goal, and required horsepower.

* * * * *